United States Patent Office 3,462,387
Patented Aug. 19, 1969

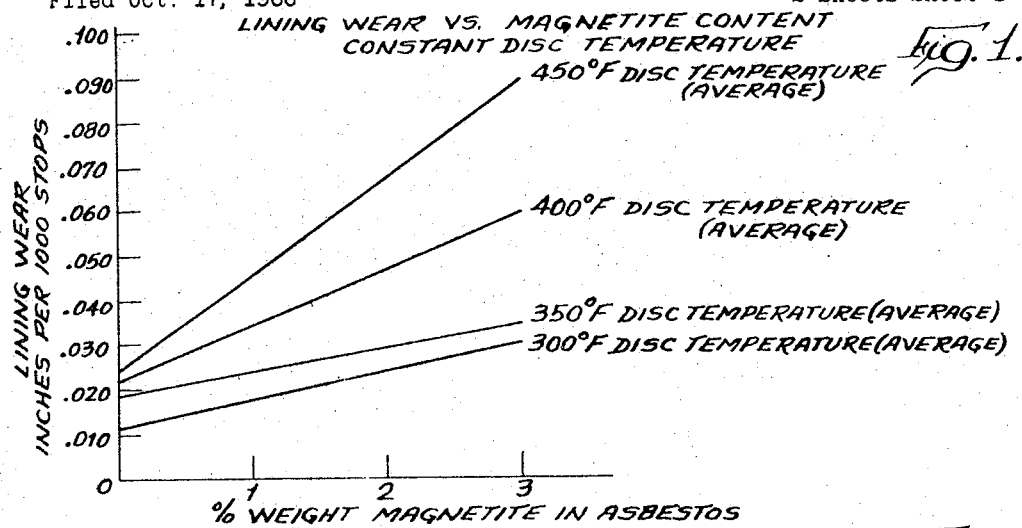
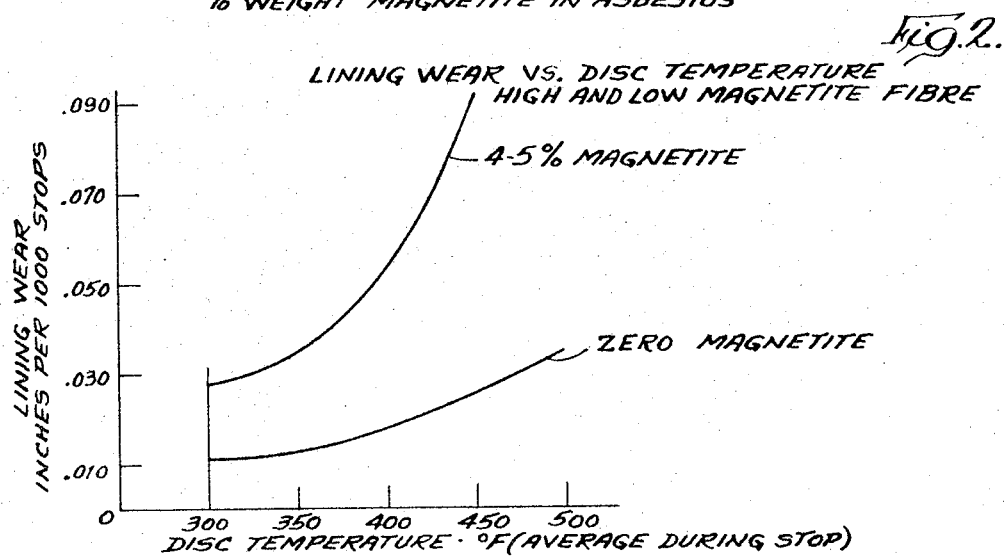
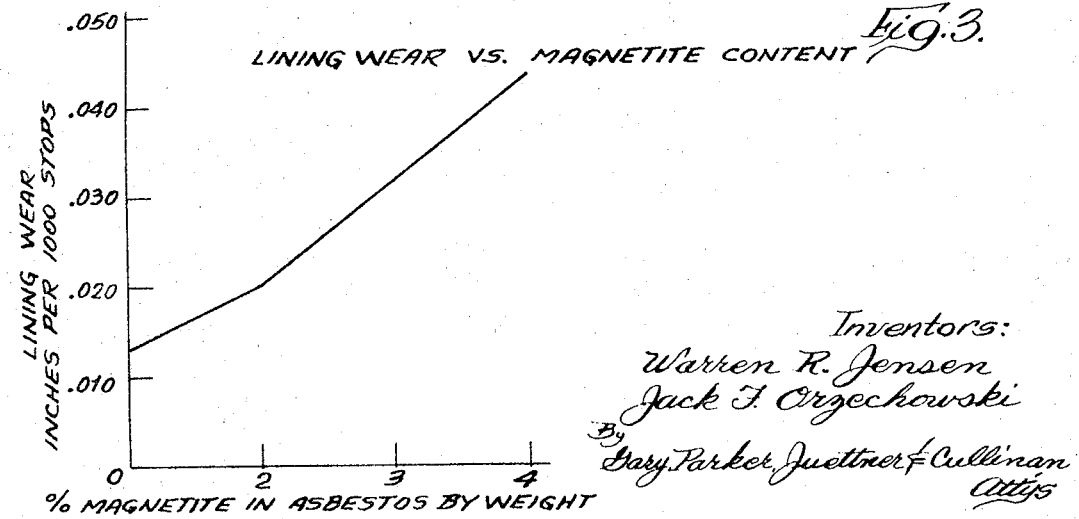

3,462,387
FRICTION MATERIAL
Warren R. Jensen, Stratford, and Jack F. Orzechowski, Orange, Conn., assignors to Raybestos-Manhattan, Inc., Passaic, N.J., a corporation of New Jersey
Filed Oct. 17, 1966, Ser. No. 587,272
Int. Cl. C08g 51/10
U.S. Cl. 260—38                     4 Claims

ABSTRACT OF THE DISCLOSURE

Friction material comprised of fibrous asbestos and containing less than 1% by weight of magnetite particles all of which pass a 320 mesh screen, and the combination thereof with a ferrous metallic mating member.

---

This invention relates to improvements in fibrous asbestos-containing friction material compositions or linings and to friction couples employing same in combination with a metallic mating member designed for arresting and retarding the motion of a vehicle or other mechanism.

Composition friction materials of this class contain from about 15% to about 50% or more by weight of fibrous asbestos, together with friction augmenting and modifying agents and a hardened organic binder, such as for example, phenol formaldehyde resin per se or in modified form, and others.

Asbestos, which is a naturally occurring mineral fiber, usually contains concomitant magnetic particles of varying size and amount, such as up to about 4–5% by weight, depending on both fiber grade (generally speaking, longer fibers contain less magnetite) and location of the ore body from which it is derived.

Obviously the diligence of the cleaning operations performed on the asbestos by the producer is also a factor. In general, however, the friction material manufacturer accepted what was delivered and used it assuming the magnetite content was consistent or innocuous to the performance of the end product. It was found that when empolying commercial asbestos in the production of fibrous asbestos composition friction materials of the class aforesaid, in combination with metallic mating elements in the form of brake drums and discs composed of conventional cast iron conventionally employed for such purposes, that high wear and scored drums resulted in approximately two-thirds of the tests.

It is therefore an object of the present invention to minimize, if not eliminate, drum scoring and high lining wear rates. Although attempts have been made to control this by removing conventionally employed hard fillers and substituting therefor less abrasive ones, in general no significant progress was made until it was found that the cause of the high lining wear rate and drum scoring was due to the magnetite content of the fibrous asbestos material employed. As a result of this it was found that there was a straight line function between magnetite content of the fibers and lining wear, when the magnetite content is above about 1% by weight, even though the magnetite particles are fine, i.e. pass through a 320 mesh screen. The same type of curve is also true for drum or disc surface finish. Moreover, it was found that as use and temperature of the friction couple increases, the deleterious effects of magnetite, as it occurs in most asbestos, is heightened.

Magnetite has a Mohs' scale hardness of approximately 6, whereas conventional cast iron brake drums and discs have a Mohs' scale hardness of about 4–5, and this disparity presumably accounts for the high wear rates both in friction of the composition asbestos-containing friction composition element and the metal mating member.

In accordance with the present invention, we have discovered that improvements in wear rates as high as 200% may be obtained by eliminating or substantially eliminating all concomitant magnetite particles. However, a maximum of 1% by weight of particles which pass through a 320 mesh screen can be tolerated.

Of course, friction particle fillers, i.e., friction augmenting or modifying agents, having a hardness greater than that of a metal mating element should also be eliminated to improve the aforesaid wear of the asbestos-containing friction element and scoring of the metal mating member.

It has heretofore been proposed to remove more or less natural occurring magnetite content from asbestos by such methods as passing lumps of fiber in crude or rock form over magnetic belt separators; subjecting mechanical fiberized asbestos material to vibratory screening to screen out magnetite from asbestos fibers; subjecting fiberized asbestos to agitation by means of air blasts to separate heavier particles of magnetite by gravity; and flotation processes employing water or other liquids for settling out magnetite and other mineral impurities. Chemical processes which open up the asbestos fibers by means of dispersing agents, following which the dispersed fibers are subjected to screening, and other means are also known particularly for enhancing the dielectric character of asbestos insulating materials. Removal of magnetite particles of undesired size can also be accomplished by settling out the magnetite particles either alone or attached to asbestos fibers, in aqueous processes employed for production of felted asbestos fiber board.

A typical batch of commercial fibrous asbestos, such as might have been heretofore employed in the production of brake lining, contains approximately 4–5% by weight of magnetite particles largely attached to the asbestos fibers. For example, a No. 7 grade Canadian crysotile asbestos contains 3.3% magnetite ($Fe_3O_4$), 45.6% of which is retained on a 60 mesh screen and the balance finer, some of which passes a 320 mesh screen.

Tests were made on lining wear rates by preparing asbestos friction linings having varying percentages of naturally occurring magnetite where the particles were both above and below 320 mesh size, and running them against cast iron discs on a dynamometer, and the results plotted as shown in the accompanying figures; wherein:

FIG. 1 shows lining wear versus magnetite content of the fibers with constant disc temperature;

FIG. 2 shows lining wear versus disc temperature comparing high and low magnetite content fiber;

FIG. 3 shows lining wear versus magnetite content of fiber;

Thus, FIG. 1 demonstrates that the wear rate of the brake lining in inches per one thousand stops, while varying at different disc temperatures is a straight line function for each temperature and increases as the weight percent of magnetite in the asbestos increases.

FIG. 2 demonstrates that the lining wear in inches per one thousand stops of a lining containing 4–5% by weight of magnetite content of fiber increases rapidly as the disc temperature increases as compared with a lining containing 0% magnetite.

FIG. 3 demonstrates that the lining wear in inches per one thousand stops at an average disc temperature of 300° F. is a substantially straight line function of the percent by weight of magnetite in the asbestos, the percent magnetite in this case rising to 4% by weight.

Figure 4:
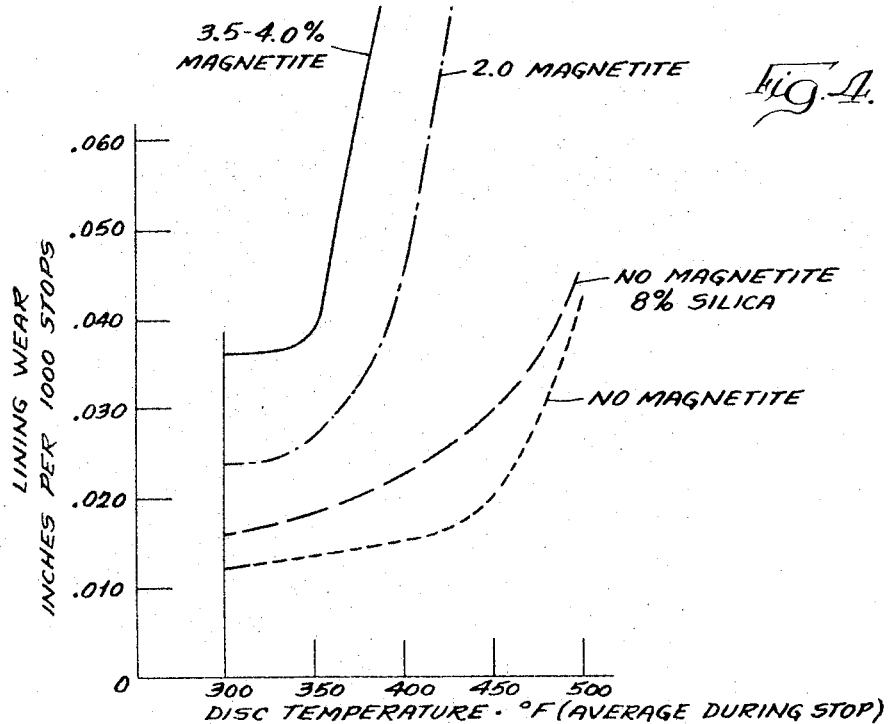
FIG. 4 shows lining wear versus disc temperature.

FIG. 4 compares lining wear rate per one thousand stops versus disc temperature from start to finish in a series of tests, comparing samples containing 4–5% of magnetite of graded particle size in asbestos composition lining versus a similar lining containing no magnetite, and in further comparison with one containing no magnetite but containing 6% of silica flour. The silica flour was employed as a component of the filler materials used in a typical asbestos brake lining formulation.

From the silica flour curve it is apparent that hardness is not the complete answer; and we can theorize that when magnetite, which is an iron-bearing compound, and a similar compound (cast iron drums or rotors) are mated, they have a mutual attraction for one another. Either some magnetite is pulled from the lining and deposited on the drum or vice versa. This could and probably does occur if the frictional interface approaches the melt point of iron. Once the transfer takes place, its rate increases with each application and the corresponding score and wear increase catastrophically. This does not occur with the hard silica flour since it is a non-iron-containing compound and merely scrubs the iron drum or rotor.

Figure 5:
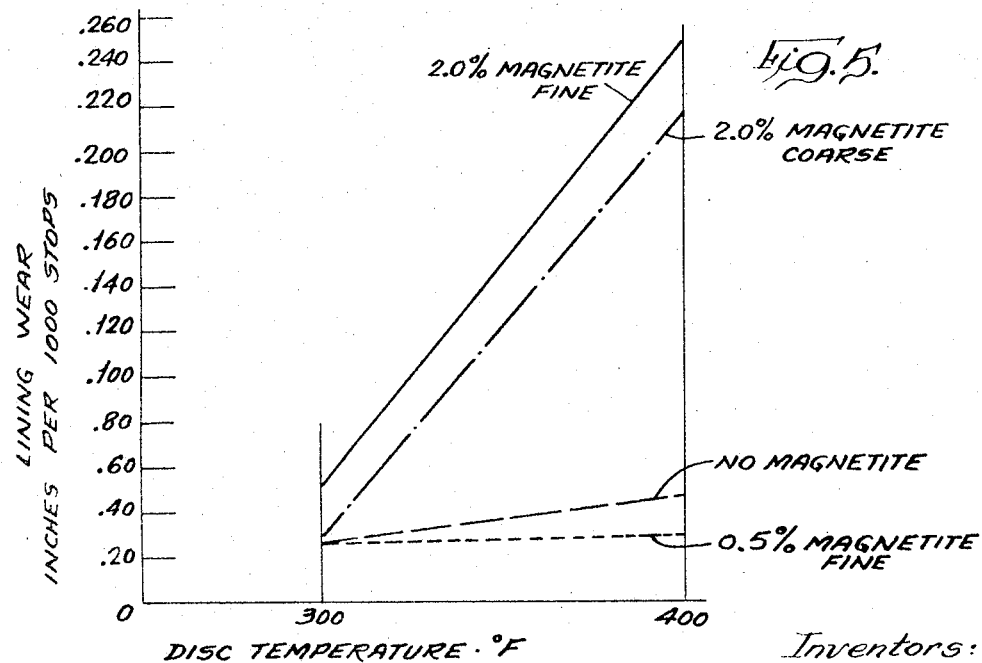
FIG. 5 shows lining wear versus disc temperature, comparing magnetite content of fiber.

FIG. 5 compares the wear rate of a friction lining having no magnetite with the same linings containing 0.5% and 2% by weight of fine magnetite particles passing a 320 mesh screen.

From the foregoing, the deleterious effect of magnetite content is apparent, the deleterious effect being heightened as use and temperature of the friction couple increases.

The following are typical asbestos composition lining formulas employed in the foregoing tests wherein magnetite content of the asbestos fiber are varied in accordance with the foregoing:

EXAMPLE 1

| Formula | Percent dry vol. | Percent dry wgt. |
|---|---|---|
| Asbestos fiber | 42 | 58 |
| Binders | 34 | 21 |
| Fillers | 24 | 21 |
| | 100 | 100 |

EXAMPLE 2

| Formula | Percent dry vol. | Percent dry wgt. |
|---|---|---|
| Asbestos fiber | 15 | 14 |
| Binders | 20 | 10 |
| Fillers | 65 | 76 |
| | 100 | 100 |

As previously indicated, the binder content can be a conventional hardenable organic material such as phenol formaldehyde resin or an oil-modified phenolic resin, together with rubber, cashew nut shell resin and others conventionally employed in the friction material art in varying amounts.

The fillers are conventional friction augmenting materials.

We claim:
1. The method of making asbestos-containing friction material compositions or linings for arresting and retarding the motion of vehicles and other mechanisms and for minimizing high wear and score of conventional metallic drums or mating members which comprises forming said friction materials by combining asbestos fibers having a magnetite particle content of less than 1% by weight and wherein all magnetite particles pass a 320 mesh screen with heat hardenable binder and friction augmenting and modifying agents.

2. The method of claim 1 wherein the asbestos is substantially free of magnetite particles.

3. The method of making a friction couple comprising a porous metallic mating member and a lining comprised of fibrous asbestos and hardened organic binder and wherein the asbestos normally contains more than 1 percent by weight of magnetite particles, the step which comprises first removing magnetite particle content from the asbestos in excess of 1 percent by weight and all magnetite particles retained on a 320 mesh screen.

4. The method of claim 3 wherein the asbestos is substantially free of magnetite particles.

References Cited

UNITED STATES PATENTS

| 3,215,494 | 12/1965 | Hemstock | 106—36 |
| 3,014,884 | 12/1961 | Bray | 106—36 |
| 3,307,969 | 3/1967 | Quinn | 106—36 |

FOREIGN PATENTS 568,995  1/1959  Canada.

ALLAN LIEBERMAN, Primary Examiner

R. BARON, Assistant Examiner

U.S. Cl. X.R.

106—36, 38